(12) United States Patent
Park et al.

(10) Patent No.: US 8,630,816 B2
(45) Date of Patent: Jan. 14, 2014

(54) HIGH SPATIAL RESOLUTION FIBER OPTIC TEMPERATURE SENSOR

(75) Inventors: Brian Park, Austin, TX (US); Mohammed Fassih-Nia, Austin, TX (US); Brian K. McCoy, Magnolia, TX (US); Kent Kalar, Austin, TX (US); Kari-Mikko Jaaskelainen, Katy, TX (US)

(73) Assignee: SensorTran, Inc., Austin, TX (US)

( * ) Notice: Subject to any disclaimer, the term of this patent is extended or adjusted under 35 U.S.C. 154(b) by 444 days.

(21) Appl. No.: 12/998,626

(22) PCT Filed: Nov. 16, 2009

(86) PCT No.: PCT/US2009/006121
§ 371 (c)(1), (2), (4) Date: May 10, 2011

(87) PCT Pub. No.: WO2010/056353
PCT Pub. Date: May 20, 2010

(65) Prior Publication Data
US 2012/0010846 A1 Jan. 12, 2012

Related U.S. Application Data

(60) Provisional application No. 61/199,480, filed on Nov. 17, 2008.

(51) Int. Cl.
*G01K 11/30* (2006.01)
*G01K 11/12* (2006.01)
*G01K 13/02* (2006.01)
*G01J 5/08* (2006.01)
*G01J 5/00* (2006.01)
*G01J 3/42* (2006.01)
*H04J 14/02* (2006.01)
*G01F 23/00* (2006.01)

(52) U.S. Cl.
USPC ......... 702/134; 166/250.01; 385/12; 356/625

(58) Field of Classification Search
USPC ....................................................... 702/134
See application file for complete search history.

(56) References Cited

U.S. PATENT DOCUMENTS

| | | |
|---|---|---|
| 3,807,227 A | 4/1974 | Smith, Jr. |
| 4,947,682 A | 8/1990 | Anderson et al. |
| 6,176,323 B1 | 1/2001 | Weirich et al. |

(Continued)

FOREIGN PATENT DOCUMENTS

JP 03-130531 U * 12/1991

OTHER PUBLICATIONS

Author: Alan D. Kersey, Title: A Review of Recent Developments in Fiber Optic Sensor Technology, Date: Feb. 13, 1996, publisher/Edition or Volume: Fiber Optic Smart Structures Section, Naval Research Laboratory, Washington, DC 20375-5000.*

*Primary Examiner* — Tung S Lau
*Assistant Examiner* — Stephanie Chang
(74) *Attorney, Agent, or Firm* — Michael A. Ervin; John W. Wustenberg; Krueger Iselin LLP (57) ABSTRACT

High resolution distributed temperature sensors using fiber optic distributed temperature sensing systems deployed on various carriers to significantly improve spatial resolution and provide high resolution temperature profile and detection of fluid or fluid interface levels.

17 Claims, 9 Drawing Sheets

(56) References Cited

U.S. PATENT DOCUMENTS

| | | |
|---|---|---|
| 6,497,279 B1 | 12/2002 | Williams et al. |
| 6,532,839 B1 * | 3/2003 | Kluth et al. .................. 73/866.5 |
| 6,769,805 B2 | 8/2004 | Williams et al. |
| 6,789,621 B2 | 9/2004 | Wetzel et al. |
| 6,817,257 B2 * | 11/2004 | Kluth et al. .................. 73/866.5 |
| 6,817,759 B2 | 11/2004 | Chi et al. |
| 6,873,772 B2 | 3/2005 | Nakaya |
| 7,334,637 B2 | 2/2008 | Smith, Jr. |
| 7,398,680 B2 | 7/2008 | Glasbergen et al. |
| 7,409,858 B2 | 8/2008 | Dria et al. |
| 7,876,982 B2 * | 1/2011 | Park et al. ....................... 385/12 |
| 8,503,599 B2 * | 8/2013 | Koste et al. .................... 376/247 |
| 2003/0122535 A1 * | 7/2003 | Williams et al. ............... 324/107 |
| 2004/0006429 A1 | 1/2004 | Brown |
| 2004/0084180 A1 | 5/2004 | Shah et al. |
| 2004/0096614 A1 | 5/2004 | Quigley et al. |
| 2006/0065393 A1 * | 3/2006 | Williams et al. ......... 166/250.03 |
| 2006/0214098 A1 | 9/2006 | Ramos |
| 2007/0158064 A1 | 7/2007 | Pribnow et al. |
| 2008/0236837 A1 | 10/2008 | Lovell et al. |
| 2009/0123110 A1 * | 5/2009 | Park et al. ....................... 385/13 |
| 2010/0104060 A1 * | 4/2010 | Koste et al. .................... 376/247 |
| 2012/0010846 A1 * | 1/2012 | Brian et al. .................... 702/134 |

* cited by examiner

HIGH SPATIAL RESOLUTION FIBER OPTIC TEMPERATURE SENSOR

This application claims the priority of U.S. provisional 61/199,480 (Nov. 17, 2008).

BACKGROUND OF THE INVENTION

The present invention relates generally to temperature sensing and, more particularly, to improving spatial resolution in a distributed temperature sensing system by the use of special sensor configurations.

Fiber optic Distributed Temperature Sensing (DTS) systems developed in the 1980s to replace thermocouple and thermistor based temperature measurement systems. DTS technology is based on Optical Time-Domain Reflectometry (OTDR) and utilizes techniques originally derived from telecommunications cable testing. Today DTS provides a cost-effective way of obtaining hundreds, or even thousands, of highly accurate, high-resolution temperature measurements. DTS systems today find widespread acceptance in industries such as oil and gas, electrical power, and process control.

The underlying principle involved in DTS-based measurements is the detection of spontaneous Raman back-scattering. A DTS system launches a primary laser pulse that gives rise to two back-scattered spectral components. A Stokes component that has a lower frequency and higher wavelength content than the launched laser pulse, and an anti-Stokes component that has a higher frequency and lower wavelength than the launched laser pulse. The anti-Stokes signal is usually an order of magnitude weaker than the Stokes signal (at room temperature) and it is temperature sensitive, whereas the Stokes signal is almost entirely temperature independent. Thus, the ratio of these two signals can be used to determine the temperature of the optical fiber at a particular point. The time of flight between the launch of the primary laser pulse and the detection of the back-scattered signal may be used to calculate the location of the scattering event within the fiber.

Distributed Temperature Sensing (DTS) has been used to monitor parameters such as, for example, temperature profiles in vessels or tanks as well monitor parameter on the surface of the vessel or tank.

In most DTS applications, current DTS systems use one or more of these sensors placed at various locations throughout. Each of these sensors has a resolution of about 1 meter, which may not provide an accurate measurement. Further, the use of the multiple sensors to compensate for the inaccurate measurement is expensive to manufacture and is physically and electrically complex, thus causing rise to reliability issues.

As the use of DTS systems expands there is an increasing need for systems with significantly improved spatial resolution. To a limited extent this can be achieved with more sophisticated DTS systems (electronics and software). But that avenue is limited in the quest for major improvements in spatial resolution. For major improvements new approaches in the deployment of the optical fiber are needed.

This need is met in the solutions to be described.

SUMMARY OF THE INVENTION

The need is met by a a high resolution distributed temperature sensor (DTS) assembly including at least a processor, a DTS system coupled to the processor, and a sensor coupled to the DTS system, the sensor including at least a sensor carrier, a covering material disposed around the sensor carrier, a first optical fiber having a first end and a second end wrapped along a portion of the carrier and over the covering material at one or more predetermined pitchs; an optical connector for joining two optical fibers connected at the second end of the first optical fiber, a second optical fiber for communicating the sensed parameters to the DTS system, the second optical fiber connected to the first optical fiber using the optical connector.

The system can be configured with any number of commercially available optic fibers. The use of new technology fibers such as Corning's ClearCurve fibers that maintain attenuation with much smaller radii bends than conventional fibers is also anticipated in this disclosure.

The assembly described herein also includes the potential use of fiber sensor bodies in which the carrier might include a central core with a mechanism for heating and cooling the immediate environment around the optical fiber allowing the measurement of the resulting heating and cooling cycles to enable detection of fluid levels or the presence of various fluid/fluid interfaces in measured environments.

Other features and associated advantages will become apparent with reference to the following detailed description of specific embodiments in connection with the accompanying drawings.

BRIEF DESCRIPTION OF THE SEVERAL VIEWS OF THE DRAWING

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Preferred embodiments and their advantages are best understood by reference to FIGS. 1 through 11, wherein like numbers are used to indicate like and corresponding parts.

The present disclosure provides systems and methods for increasing the spatial resolution of a distributed temperature sensing system by creating new sensors especially adapted to improve spatial resolution by significantly increasing the density of fiber at desired locations by wrapping an optical fiber along a sensor carrier at a specific pitch. The term pitch in this context is used as a metric for how closely wrapped the fiber is around the carrier and is explained later in the discussion of FIG. 4. The sensor carrier may be, for example, a flexible or non-flexible cylinder or other geometric shape (e.g., a cylinder, a cone, a sphere, a hemisphere, a toroid, a cube, a prism, a pyramid, a rectangle, etc.) that may be used to determine parameters such as, for example, temperature, depth of fluids, and other parameters in an environment.

In practical applications of deploying optical fibers a key consideration is the bend radius of the fiber. Commercial fibers have a recommended minimum bend radius that if exceeded can result in undesired variations (attenuation) in backscattered light intensities during DTS operations. The fiber sensors to be described are configured to adhere to those recommendations. It should also be noted however that new technologies now emerging in optical fibers, example—ClearCurve fibers from Corning, are now offering optical fibers that maintain attenuation with much smaller radii bends than conventional fibers. This application anticipates the potential use of such fibers in some embodiments.

Figure 1:
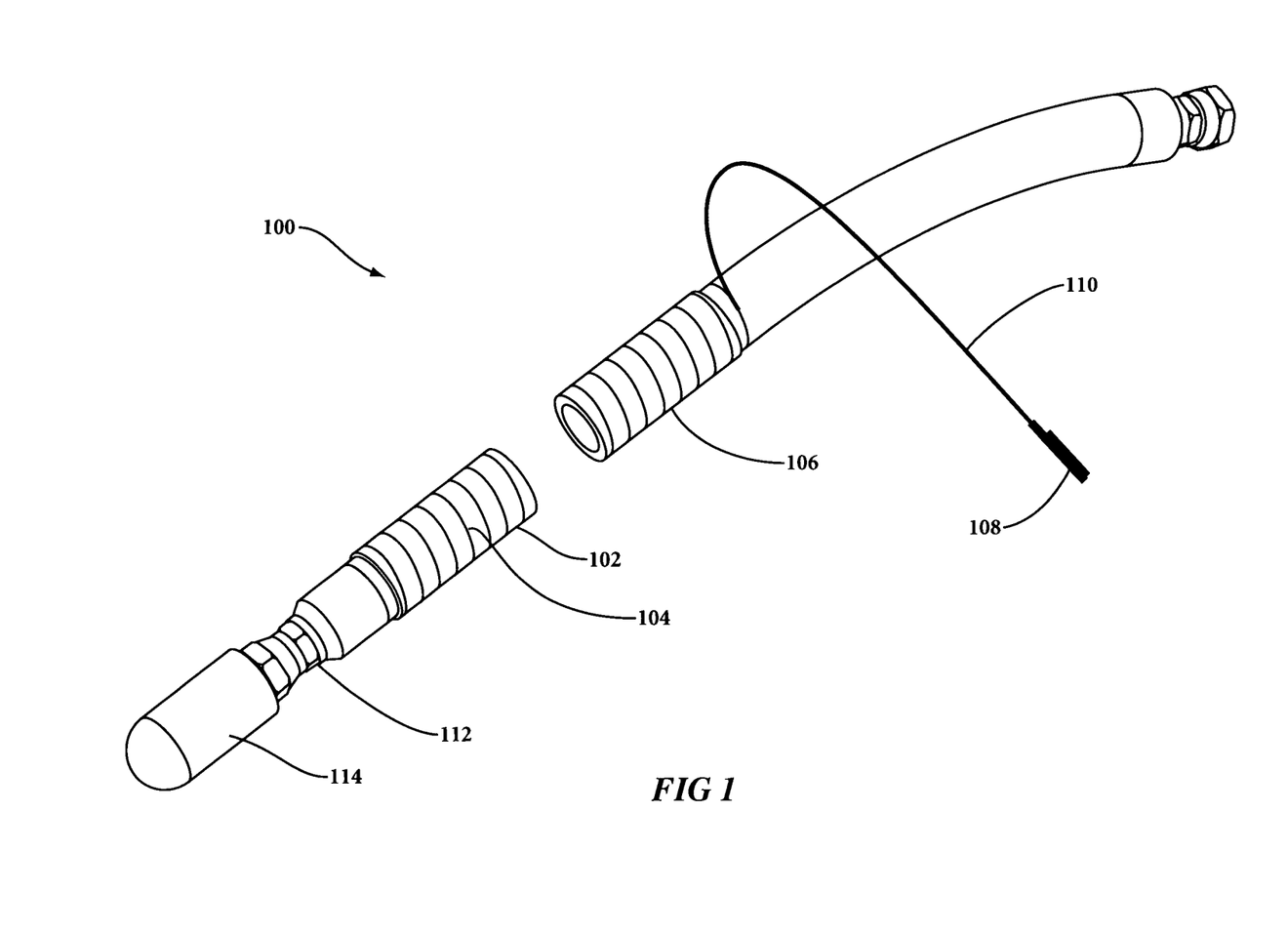
FIG. 1 illustrates a sensor with an optical fiber wrapped around a sensor carrier, in accordance with embodiments of the present disclosure.
Figure 2:
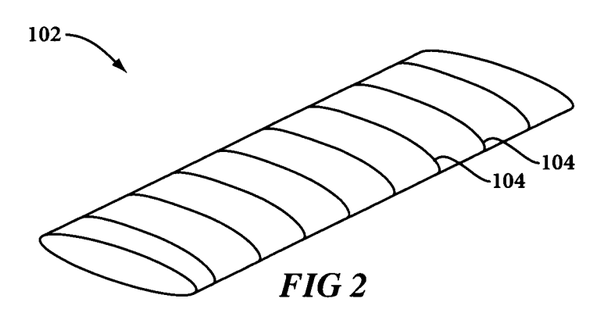
FIG. 2 illustrates a sensor with an optical fiber wrapped around a sensor carrier, in accordance with embodiments of the present disclosure.
Figure 3:
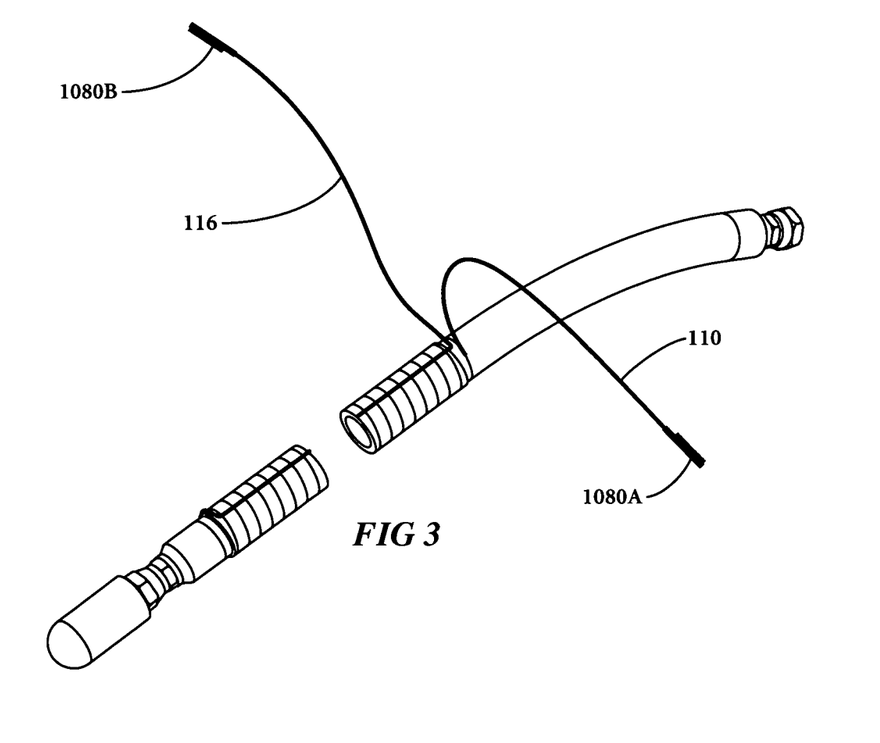
FIG. 3 illustrates a sensor with an optical fiber wrapped around a sensor carrier, in accordance with embodiments of the present disclosure.

FIGS. 1 and 3 illustrate an example of a sensor 100, in accordance with embodiments of the present disclosure. Sensor 100 may include a sensor carrier 102, a first optical fiber 104, a heat shrink cover 106, a connector 108, a second optical fiber 110, a fitting 112, and a brass weight 114. Sensor carrier 102 may be a rigid or flexible cylinder. Alternatively, sensor carrier 102 may be a cylinder with both rigid and flexible characteristics.

It is noted here that although a right cylinder is shown, sensor carrier 102 may be other geometric shapes that may be used separately or in combination with the cylinder. For example, referring to FIG. 2, sensor carrier 102 may have an elliptical shape and may include optical fiber 104 wrapped along the length of sensor carrier 102. In other embodiments, sensor carrier 102 may be rectangular in shape. Sensor carrier 102 may also have variable geometric shapes (e.g., a cylindrical tube that transitions into an elliptical tube at key measurement points) across the length based at least on the design aspects of sensor 100 and the environment in which sensor 100 is deployed.

Referring again to FIG. 1, sensor carrier 102 may be protected by a heat shrink cover 106. In the same or alternative embodiment, sensor carrier 102 may be protected by other encapsulation using, for example, flexible potting compounds or other coating and protection techniques known in the art. In some embodiments the optical fiber may be embedded in composite material that provides both structure and protection to the fiber. Heat shrink cover 106 may be used to secure optical fiber 104 to sensor carrier 102.

Sensor carrier 102 can for some applications be a very long and thin cylinder, i.e. a cable that is wrapped with optical fiber at various pitches as it goes though an extrusion machine and is over-molded with a suitable jacket.

In other embodiments sensor carrier 102 may have an internal electrical heater cable (resistance wire) running the length of sensor carrier 102 to enable periodic heating of the total sensor for purposes of detecting other parameters such as liquid levels or phase changes in tanks or deep wells. This is explained further in the discussions of FIGS. 5-11.

The sensor carrier may be a tube wrapped fiber and contain one or several hole(s) or tube(s) in the center. The distant cable end may be open and the cable may be flushed through the center hole with a fluid having a temperature different from the surrounding where the sensor is deployed. Alternatively the two tubes may be connected at the distant end of the cable ensuring that no fluids will be deposited at the distant end of the cable. The cable will warm back at different rates once the fluid circulation has ceased and depending on the thermal conductivity of the fluid the cable is immersed in, different sections of the cable will warm back at different rates. This approach may be advantageous in areas where electrical equipment like electrical resistance heaters may generate sparks and ignite hazardous gases.

Sensor 100 may also include various standard hose fittings 112 at one or both distal ends of sensor carrier 102. In one embodiment, one distal end of fitting 112 may include a bull nose brass weight 114 for providing a pendulum effect to straighten sensor carrier 102 during installation (e.g., preventing sensor 100 from sticking to the walls of a vessel, tank, bore, etc.). In some embodiments, weight 114 may include a hole for fluid to enter and pass through the interior of sensor carrier 102 to reduce and/or substantially eliminate any buoyancy effects.

It is noted that while FIG. 1 shows a bull nose brass weight at one distal end of sensor carrier 102, other suitable weights may be used to prevent sensor carrier 102 from bending, sticking to a vessel, preventing buoyancy issues, and the like. For example, the weight may be distributed throughout the length of sensor carrier 102, using for example, a weighted rigid tub inserted into the interior of sensor carrier 102.

Sensor 100 may include fiber 110 coupled to sensor carrier 102, where the fiber may be configured to send data sensed from optical fiber 104 to a distributed temperature sensing system, as discussed in more detail with respect to FIGS. 5 through 9. Fiber 110 may be spliced at one distal end that may be connected to connector 108. In some embodiments, the other distal end of fiber 110 may terminate at the cylinder as shown in FIG. 1, or may be spliced into return line 116, which returns the fiber to the surface as shown in FIG. 3. Return line 116 may be returned linearly or coiled between optical fiber 104 so that return line 115 does not overlap the optical fiber 104 and cause stress points. In the same or alternative embodiments, optical fiber 104 may be rewound back up the sensor carrier 102 between the optical fiber 104 and may serve as a second optical fiber.

Figure 4:
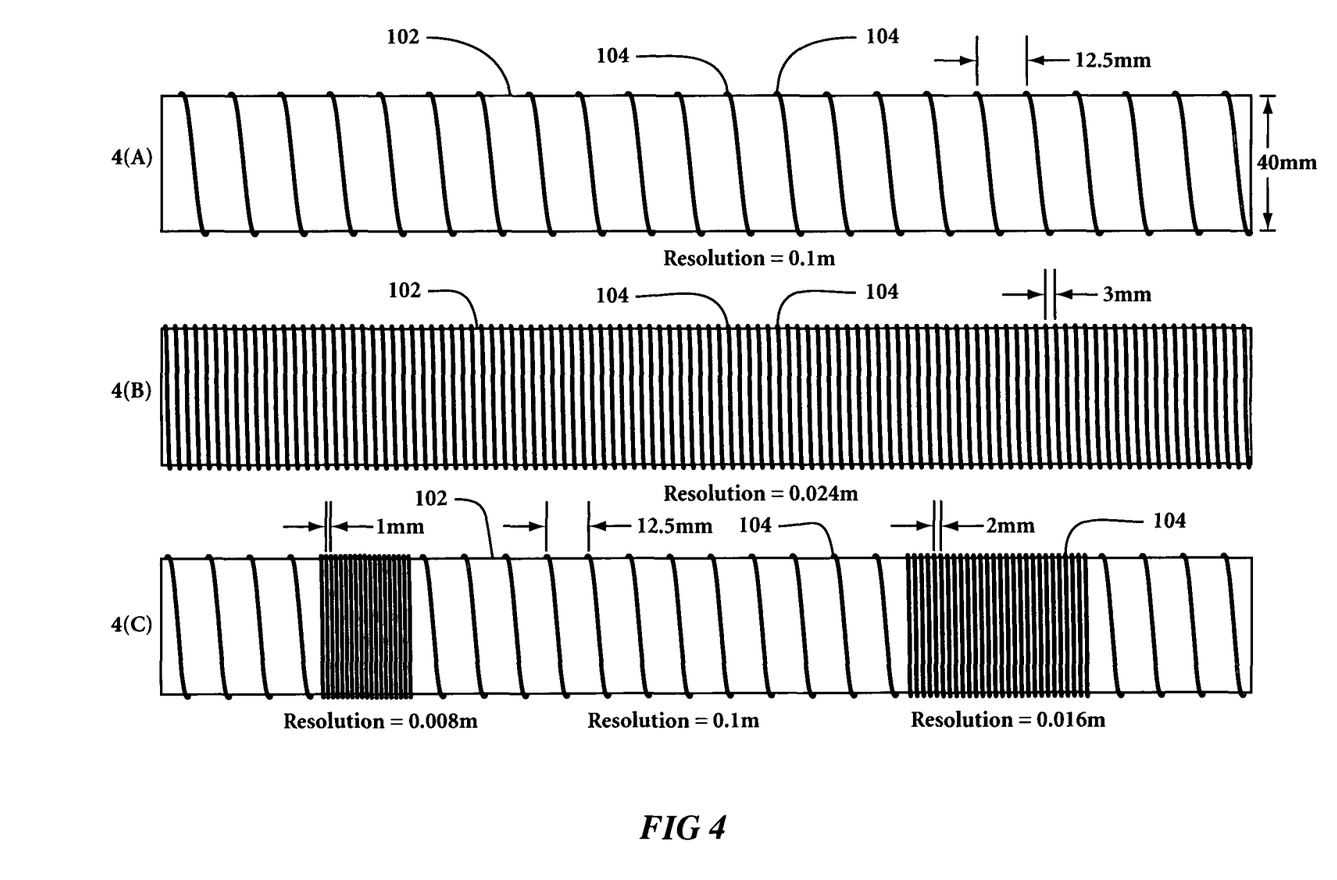
FIG. 4 illustrates a various pitches and resolutions, in accordance with embodiments of the present disclosure.

In operation, the description herein provides multiple options for achieving a more accurate and dependable parameter reading by increasing the resolution of the sensing fiber. In one embodiment, the winding of optical fiber 104 may be a predetermined or fixed pitch to achieve finer resolutions. Examination of FIG. 4 shows that different combinations of carrier circumference and pitch can give finer and finer resolution measurement. For example, if the diameter of sensor carrier 102 is about 40 millimeters, and the pitch is about 12.5 millimeters, the spatial resolution is about 100 millimeters, as shown in FIG. 4(A).

By varying the pitch of optical fiber 104, the resolution may be changed. For example, referring to FIG. 4(B), the pitch of optical fiber 104 on sensor carrier 102 (having the same diameter as shown in FIG. 4(A) is about 3 millimeters yielding a resolution of about 24 millimeters.

In some embodiments, the pitch may vary over the length of sensor carrier 102. For example, in applications such as oil wells, there may be a need for a higher resolution at one distal end of sensor 100 as compared to the other distal end of sensor 100 near the surface. Referring to FIG. 4(C), optical fiber 104 may be wrapped along the length of sensor carrier 102 and in various sections of sensor carrier 102; the pitch of optical fiber 104 may be different than other sections. For example, as shown in FIG. 4(C), three distinct pitches are shown (about 1 millimeters, 12.5 millimeters, and 2 millimeters) with a corresponding resolution of about 8 millimeters, 100 millimeters, and 16 millimeters, respectively.

Figure 5:
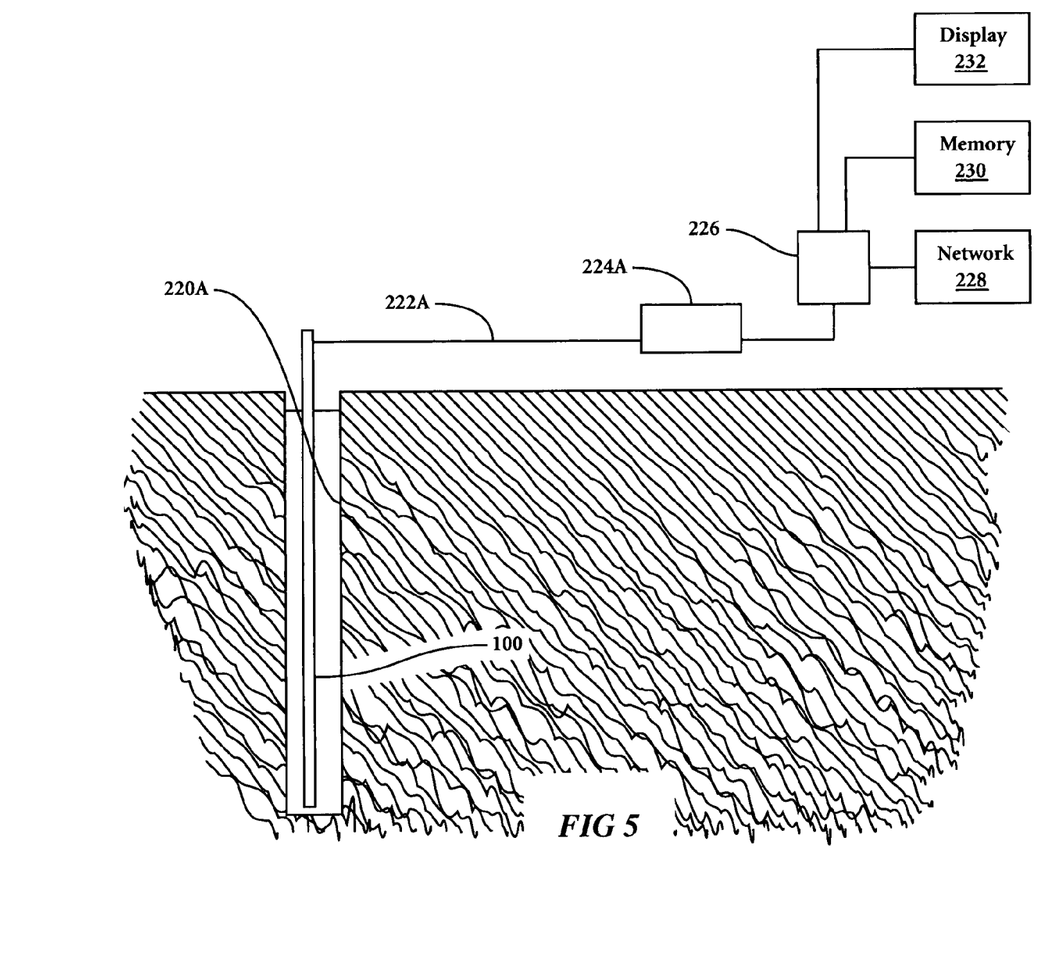
FIG. 5 illustrates detecting parameters of a tank using the sensor of FIGS. 1 through 3, in accordance with embodiments of the present disclosure.
Figure 6:
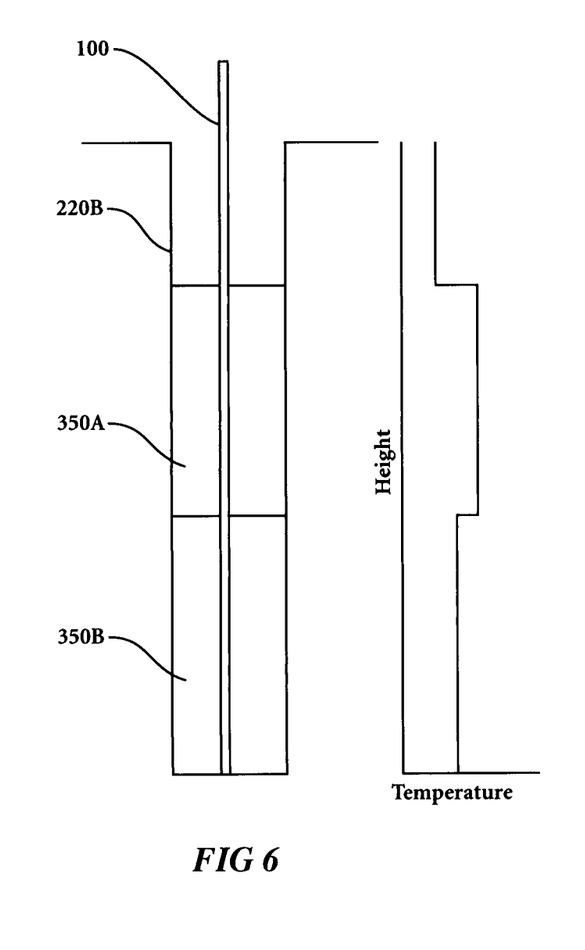
FIG. 6 illustrates detecting parameters of a tank using the sensor of FIGS. 1 through 3, in accordance with embodiments of the present disclosure.

Referring to FIG. 5, an assembly for determining parameters inside a well or tank is shown, in accordance with embodiments of the present disclosure. In one embodiment sensor 100 may be placed into well or tank 220A. Generally, DTS electronics 224A may use a laser to launch a primary laser pulse from a light source (e.g., any electromagnetic radiation source configured to transmit an optical signal). The pulse sent may give rise to two spectral components, namely Stokes, which has a lower frequency and higher wavelength content than the primary laser pulse, and anti-Stokes, which has higher frequency and lower wavelength content than the primary laser pulse. The anti-Stokes signal is usually about an order of magnitude weaker than the Stokes signal at room temperature and is typically a temperature sensitive signal while the Stokes signal is typically almost temperature independent. The ratio between the anti-Stokes and Stokes signals may be used to determine the temperature, and in combination with static and/or dynamic temperature data, fluid levels and other parameters of well or tank 220A can be determined. The application of measuring fluid levels will be explained in greater detail in the descriptions of FIGS. 6-11.

In one embodiment, optic fiber 222A may send the signals collected by optical fiber 104 from well or tank 220A to DTS system 224A. DTS system 224A may provide the data collected to processor 226 for processing. Processor 226 may be any system or apparatus configured to process the information from the backscatter component and determine various parameters, including for example, a temperature profile. Processor 226 may also contain software programming for determining other parameter such as liquid levels in tanks or in downhole situations. For example, processor 226 may be any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, processor 226 may be any data acquisition hardware, personal computer, a network storage device, a controller, or any other suitable device and may vary in size, shape, performance, functionality, and price. Processor 226 may include random access memory (RAM), one or more processing resources such as a central processing unit (CPU) or hardware or software control logic, ROM, and/or other types of nonvolatile memory. Additional components of processor 226 may include one or more disk drives, one or more network ports for communicating with external devices as well as various input and output (I/O) devices, such as a keyboard, a mouse, and/or a video display. Processor 226 may also include one or more buses operable to transmit communications between the various hardware components such as, but not limited, network port 228, memory 230, and display 232.

Network port 228 may be any suitable system, apparatus, or device operable to serve as an interface between processor 228 and/or DTS 224A and a network. Network port 228 may enable processor 228 and/or DTS 224A to communicate over a network using any suitable transmission protocol and/or standard, including without limitation all transmission protocols and/or standards known in the art.

Memory 230 may be coupled to processor 226 and may comprise any system, device, or apparatus operable to retain program instructions or data (e.g., parameters of tank 220) for a period of time. Memory 230 may be random access memory (RAM), electrically erasable programmable read-only memory (EEPROM), a PCMCIA card, flash memory, or any other type(s) and/or array of volatile or non-volatile memory.

Display 232 may be coupled to display 232 and may comprise any display device suitable for creating graphic images and/or alphanumeric characters recognizable to a user, and may include, for example, a liquid crystal display (LCD) or a cathode ray tube (CRT). In some embodiments, display 232 may provide the detected parameters (e.g., temperature, fluid levels, flow rate, etc.) from either DTS system 224A and/or processor 226.

Figure 7:
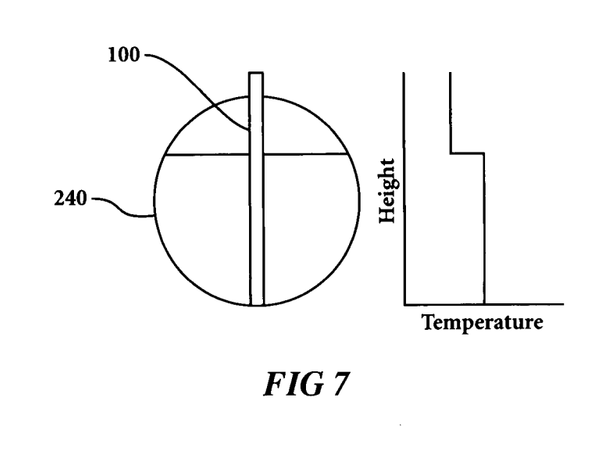
FIG. 7 illustrates detecting parameters of a tank using the sensor of FIGS. 1 through 3, in accordance with embodiments of the present disclosure.
Figure 8:
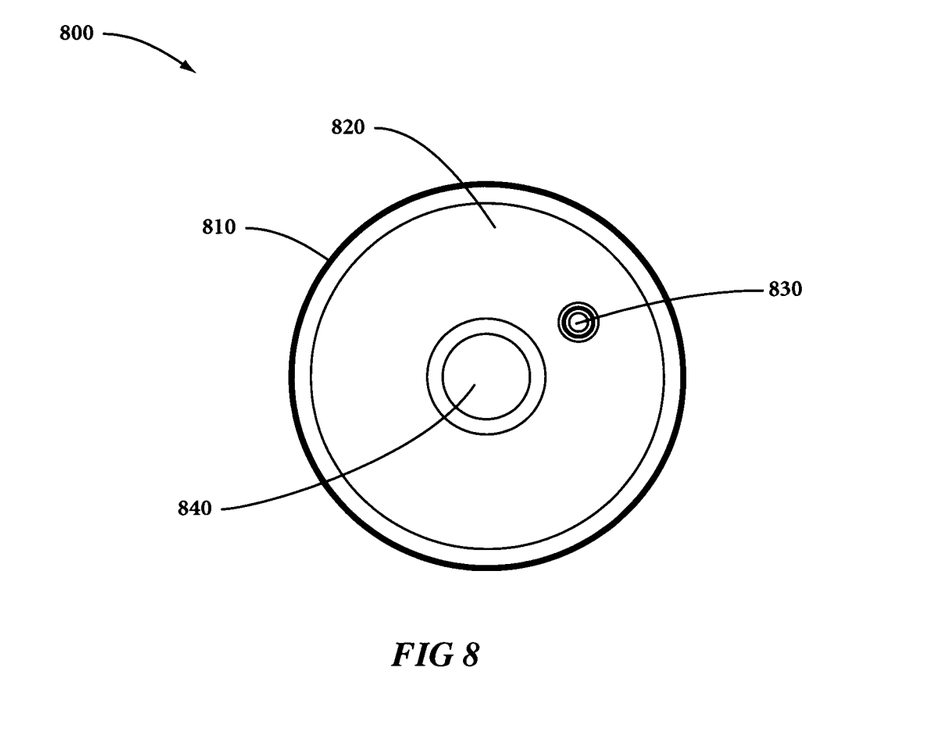
FIG. 8 illustrates a heated distributed temperature-sensing cross-section.

In some embodiments, sensor 100 may also detect other parameters than temperature. For example, in tank 220B of FIG. 6, sensor 100 may be used to determine the levels of fluid 350A and 350B in tank 220B. In this embodiment sensor 100 may have an internal electrical heater cable (resistance wire) running the length of the sensor to enable periodic heating of the total sensor for purposes of detecting other parameters such as fluid levels or phase changes in tanks or deep wells. An example sensor with such an internal electrical heater cable is shown generally as 800 in FIG. 8 where the sensor is shown in cross section The sensor has an outer covering 810, which may be a stainless steel tube, surrounded by insulation 820 and an embedded DTS optical fiber 830. An electric current may be applied to the resistance wire 840 in the cable causing it to heat the cable internally. The rate of temperature increase and decrease is measured and recorded by the DTS system as the electric current is applied and removed. Referring back to FIG. 6, depending on the environment surrounding sensor 100 (fluid 350A, fluid 350B, or air) the thermal properties of each fluid or gas will determine a different heating and cooling response, enabling a precise measurement of the levels of fluids. The measurement and calculation of fluid levels would be done in software contained in a processor such as that shown in FIG. 5. In this example one fluid might be an organic material and the other water. Similarly FIG. 7 illustrates fluid level measurement in a large tank, also by use of a DTS sensor accompanied by an internal electrical heater cable (resistance wire) running the length of the sensor to enable periodic heating of the total sensor. Again the difference in environment (liquid vs. gas) surrounding sensor 100 results in significantly different heating and cooling response, enabling a precise measurement of the level of liquid.

In these examples applications there is a need for high spatial resolution capability and the higher spatial resolution options discussed previously can be applied to the design of sensor 100. For this type of application the outer layer of sensor 100 might not be polymeric but may be a sealed metallic sheath such as thin stainless steel to maintain a completely dry sensor environment.

Figure 9:
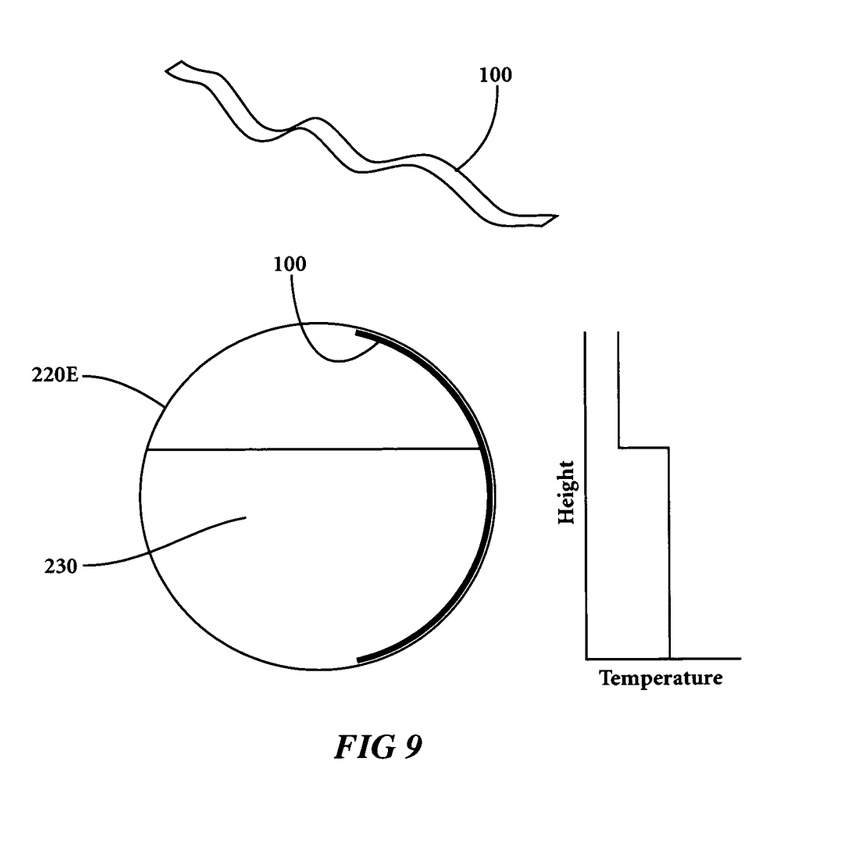
FIG. 9 illustrates the use of a flexible high-resolution sensor.

Referring to FIG. 9, in some embodiments of this application of level measurement, sensor 100 may include a flexible sensor carrier and coupled to an interior wall of a vessel and may be used to detect temperatures and/or fluid levels of the vessel. The flexible characteristics of this sensor may allow sensor 100 to adhere to or otherwise be secured to the interior of tank 220E, as shown in FIG. 9.

Figure 11:
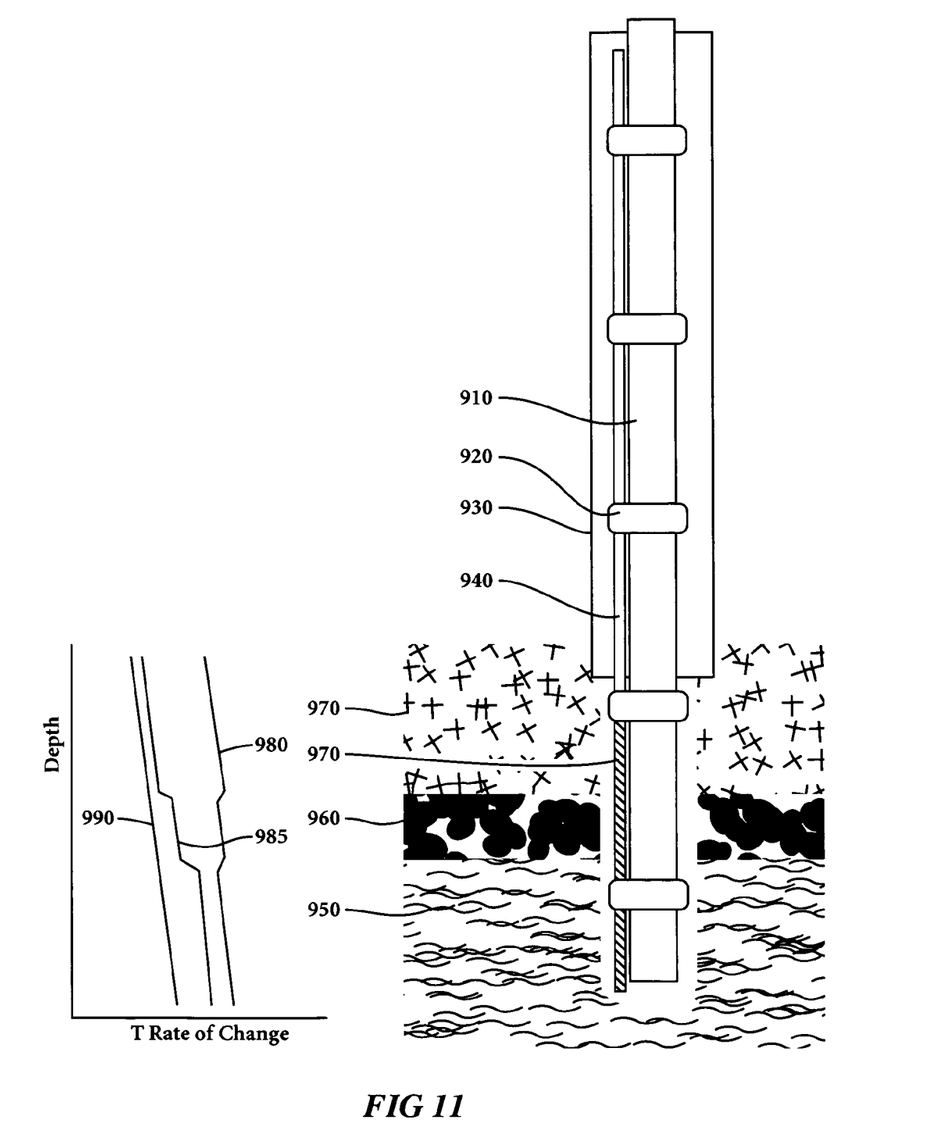
FIG. 11 illustrates the use of a sensor in detecting phase changes or density changes in fluids in an oil field application.

Referring to FIG. 11, another embodiment of such level measurement is the detection of the location of the gas/oil and oil/water interfaces in oil wells. An example need is the monitoring of these types of gas, oil, and water zones in oil rims. An oil rim is the relatively thin oil zone below a gas cap or where the top of the reservoir is below the gas/oil contact at the outer edges of a reservoir. Knowing the exact location of these oil zones is critical to successful exploitation using advanced recovery techniques. Often these rims will be encircled by a number of observation wells and FIG. 11 indicates an application of this idea to an observation well. Center tubing 910 (with tubing clamps 920) extends down through a well casing 930 and has a sensor 940 with a central electric heater cable (resistance heater) surrounded by insulation and an embedded DTS optical fiber. This resistance heater is used to pulse repeated heating and cooling cycles near the oil rim of the formation. In such an application the optical fiber may be deployed in a linear fashion along the bulk of the sensor assembly 940 (in the portion inside the casing) and then wrapped at a narrow pitch in the lower portion 970 (below casing 930) to achieve much higher resolution. The portion of the overall sensor assembly enclosed by the casing might have a larger electric cable (lower resistance) followed by a higher resistance section below the casing to achieve higher heating in the measurement section. The graphs shown in FIG. 11 demonstrate the normal geothermal gradient 990 and how the heating 980 and cooling 985 cycles can generate thermal profiles that can identify and pinpoint the location of the thin oil zone in the rim.

In the aforementioned application example and in any applications that involve the potential of explosive mixtures of flammable liquids and gases an alternate design using a sensor carrier with a tube wrapped fiber and contain one or several hole(s) or tube(s) in the center for circulating heated fluids (steam for example) might be employed. This embodiment will allow a pulsed heating and cooling cycle that can generate thermal profiles that can identify and pinpoint the location of either fluid levels or fluid/fluid interfaces.

Similarly in the field of groundwater monitoring, increased resolution is needed in studies of the mapping of submarine ground-water discharge, identification of gaining stream reaches, and the inference of fractures in boreholes. The use of the heated higher resolution cables described herein are especially well suited to better make these measurements.

In another embodiment the level sensor described could also measure the depth of fluid in a tank such as drilling mud tank by detecting the difference between the fluid temperature and the air above it. Thus it could be used as a combined temperature and level sensor with no moving parts and work with difficult fluids like drilling mud. Its intrinsic safety also makes it suitable for use with hazardous fluids. Multiple sensors of different types (temperature and level) can be connected in series to one DTS thus reducing the wiring, hazardous area requirements, and electronics of a monitoring system significantly.

Figure 10:
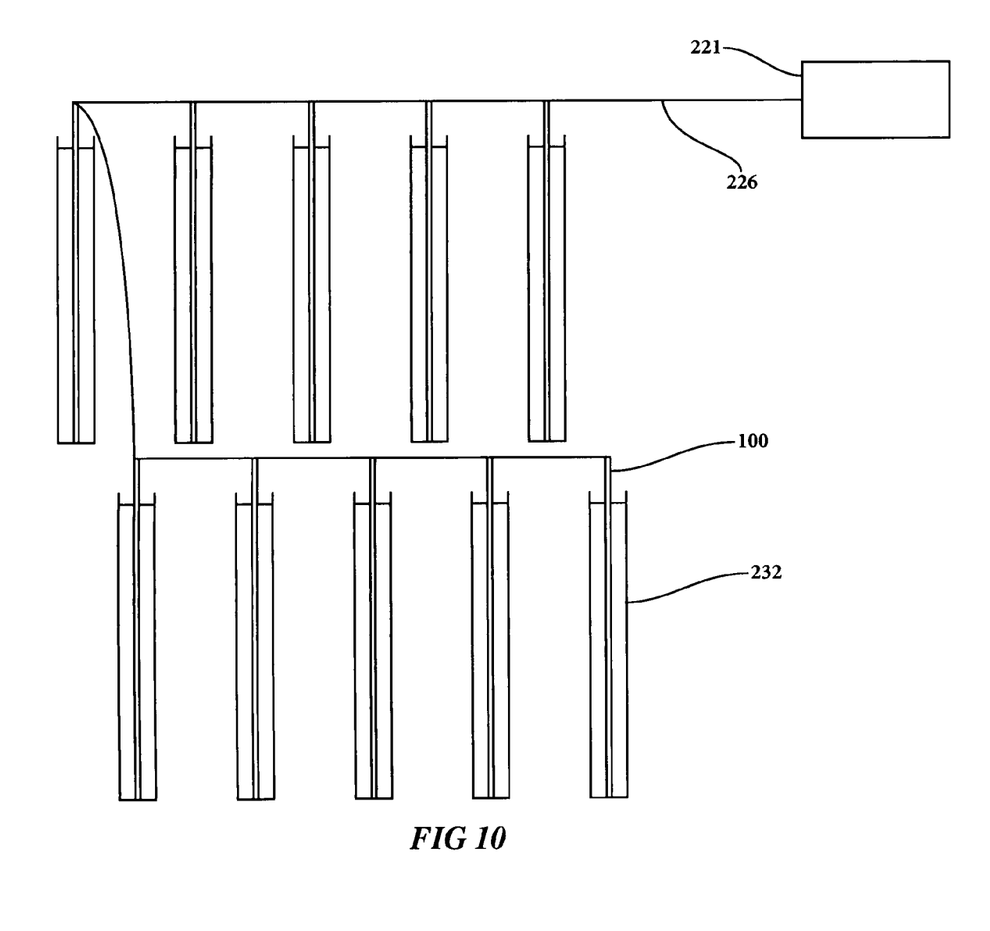
FIG. 10 illustrates the application of a network of high-resolution sensors.

The configurations shown in FIGS. 5 through 9 may be used in an array to determine the parameters of multiple, tanks, wells, and/or vessels in a single location. Referring to FIG. 10, a plurality of tanks in an array (e.g., daisy chain) configuration is shown, in accordance with embodiments of the present disclosure. Each well, vessel, or tank 232 may include sensor 100 configured to determine one or more parameters of tanks 232.

It is noted that sensor 100 may be placed into other environments that may not include enclosures like a well, a vessel, or a tank shown in FIGS. 5 through 9. For example, sensor 100 may be placed into a body of water such as a lake in which a detailed temperature profile is desired. In this example high resolution temperature measurements might be needed below certain depths and a sensor configuration such as that exhibited in FIG. 4(C) may be used with a high resolution portion on one of the distal ends deployed near the bottom of the lake.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit and scope of the disclosure. All such similar substitutes and modifications apparent to those skilled in the art are deemed to be within the spirit, scope, and concept of the disclosure as defined by the appended claims.

The invention claimed is:

1. A high resolution distributed temperature sensor (DTS) assembly comprising:
   a. a processor;
   b. a DTS system coupled to the processor; and
   c. a sensor coupled to the DTS system, the sensor comprising:
      i. a sensor carrier;
      ii. a covering material disposed around said sensor carrier;
      iii. a first optical fiber having a first end and a second end wrapped along a portion of the carrier and over said covering material at one or more predetermined pitchs;
      iv. an optical connector for joining two optical fibers connected at said second end of said first optical fiber; and
      v. a second optical fiber for communicating the sensed parameters to the DTS system; said second optical fiber connected to said first optical fiber using said optical connector.

2. The high resolution distributed temperature sensor (DTS) assembly of claim 1 wherein said second optical fiber is deployed back to and is coupled to said DTS system.

3. The high resolution distributed temperature sensor (DTS) assembly of claim 2 wherein said first optical fiber is also deployed back to and is coupled to said DTS system.

4. The high resolution distributed temperature sensor (DTS) assembly of claim 1 wherein the combination of carrier circumference and pitch give a resolution of less than 100 millimeters.

5. The high resolution distributed temperature sensor (DTS) assembly of claim 1 wherein the combination of carrier circumference and pitch give a resolution of less than 25 millimeters.

6. The high resolution distributed temperature sensor (DTS) assembly of claim 1 wherein the combination of carrier circumference and pitch give a resolution of less than 10 millimeters.

7. The high resolution distributed temperature sensor (DTS) assembly of claim 1 wherein said the shape of said sensor carrier is cylindrical.

8. The high resolution distributed temperature sensor (DTS) assembly of claim 1 wherein said the shape of said sensor carrier is selected from the group consisting of elliptical, spherical, hemispherical, toroidal, cubic, pyramidal, and rectangular.

9. The high resolution distributed temperature sensor (DTS) assembly of claim 1 wherein said sensor carrier is flexible.

10. The high resolution distributed temperature sensor (DTS) assembly of claim 1 wherein said covering material is a heat shrink material.

11. The high resolution distributed temperature sensor (DTS) assembly of claim 1 wherein said covering material is a flexible potting compound.

12. The high resolution distributed temperature sensor (DTS) assembly of claim 1 wherein said pre-determined pitch of said first optical fiber is uniform along the dimension of said sensor carrier.

13. The high resolution distributed temperature sensor (DTS) assembly of claim 1 wherein said pre-determined pitch of said first optical fiber is variably deployed along the dimension of said sensor carrier to vary the resolution of measurement.

14. The high resolution distributed temperature sensor (DTS) assembly of claim 1 further comprising added weights to said sensor carrier.

15. The high resolution distributed temperature sensor (DTS) assembly of claim 1 further comprising an internal electric heating cable deployed in said sensor carrier to enable periodic heating of said sensor.

16. The high resolution distributed temperature sensor (DTS) assembly of claim 15 wherein said sensor is deployed into tanks or deep wells and said periodic heating of said sensor and the DTS measurement of temperature profile is used for fluid level determination in said tanks or deep wells.

17. The high resolution distributed temperature sensor (DTS) assembly of claim 1 further comprising the use of heated fluids in said sensor carrier to enable periodic heating of said sensor.

* * * * *